United States Patent
Duenas

(10) Patent No.: US 11,552,892 B2
(45) Date of Patent: Jan. 10, 2023

(54) DYNAMIC CONTROL OF LATENCY TOLERANCE REPORTING VALUES

(71) Applicant: ATI Technologies ULC, Markham (CA)

(72) Inventor: Alexander S. Duenas, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/557,914

(22) Filed: Aug. 30, 2019

(65) Prior Publication Data
US 2021/0067451 A1    Mar. 4, 2021

(51) Int. Cl.
H04L 47/10    (2022.01)
G06F 13/38    (2006.01)
H04L 47/24    (2022.01)

(52) U.S. Cl.
CPC ............ *H04L 47/15* (2013.01); *G06F 13/385* (2013.01); *H04L 47/24* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 9,838,967 B2* | 12/2017 | Jeyaseelan | ............ | G06F 1/3296 |
| 10,545,701 B1* | 1/2020 | Mathews | ............... | G06F 3/0611 |
| 2012/0210032 A1* | 8/2012 | Wang | ...................... | G06F 13/24 |
| | | | | 710/260 |
| 2013/0007483 A1* | 1/2013 | Diefenbaugh | ........ | G06F 1/3278 |
| | | | | 713/320 |
| 2013/0343250 A1* | 12/2013 | Homchaudhuri | ........................... | |
| | | | | H04W 52/0251 |
| | | | | 370/311 |
| 2014/0082242 A1* | 3/2014 | Murphy | ................... | G06F 13/24 |
| | | | | 710/263 |
| 2014/0181334 A1* | 6/2014 | Jeyaseelan | .............. | G06F 13/10 |
| | | | | 710/18 |
| 2014/0181563 A1* | 6/2014 | Songer | ................... | G06F 1/3203 |
| | | | | 713/340 |
| 2014/0195833 A1* | 7/2014 | Wang | ..................... | G06F 1/3203 |
| | | | | 713/320 |
| 2015/0006931 A1* | 1/2015 | Cooper | ................. | G06F 1/3203 |
| | | | | 713/323 |
| 2015/0052404 A1* | 2/2015 | Henriques | ............. | G06F 1/3215 |
| | | | | 714/43 |

(Continued)

OTHER PUBLICATIONS

PCI Express Base Specification Rev. 3.1 (Year: 2014).*

*Primary Examiner* — Christopher T Wyllie
(74) *Attorney, Agent, or Firm* — Volpe Koenig

(57) ABSTRACT

An endpoint processing device is provided for dynamically controlling latency tolerance reporting (LTR) values. The endpoint processing device comprises memory configured to store data and a processor. The processor is configured to execute a program and send, to a root point processing device via a peripheral component interconnect express (PCIe) link, a plurality of messages each comprising a memory access request and a LTR value indicating an amount of time to service the memory access request. The processor is also configured to, for each of the plurality of messages, determine, during execution of the program, a LTR value setting and set the LTR value as the determined LTR value setting.

20 Claims, 5 Drawing Sheets

(56) References Cited

U.S. PATENT DOCUMENTS

| | | | |
|---|---|---|---|
| 2015/0370309 A1* | 12/2015 | Burstein | G06F 1/3209 |
| | | | 713/323 |
| 2016/0162421 A1* | 6/2016 | Xiong | G06F 13/20 |
| | | | 710/52 |
| 2017/0344095 A1* | 11/2017 | Hashimoto | H04N 1/00933 |
| 2018/0095512 A1* | 4/2018 | Artstain | H04W 4/80 |
| 2018/0181186 A1* | 6/2018 | Diefenbaugh | G06F 3/0656 |

* cited by examiner

DYNAMIC CONTROL OF LATENCY TOLERANCE REPORTING VALUES

BACKGROUND

Peripheral Component Interconnect Express (PCIe) is an expansion bus standard for high bandwidth communication between the internal hardware (e.g., CPU and RAM) of a computer and endpoint devices (e.g., graphics devices, Ethernet devices and USB devices) in communication with the internal hardware. PCIe architecture includes a root complex (e.g., root point device) which includes root points or root ports connecting the CPU and memory to the endpoint devices.

Latency tolerance reporting (LTR) is a PCIe feature used to improve system allocation of time and resources based on performance requirements of an endpoint (e.g., a GPU core of an endpoint device). For example, end points report memory latency (e.g., read latency and write latency) tolerances to the root point device. Allocation of system time and resources (e.g., power saving states) are determined based on the memory latency tolerances reported by the end points to manage power consumption while maintaining endpoint performance.

BRIEF DESCRIPTION OF THE DRAWINGS

A more detailed understanding can be had from the following description, given by way of example in conjunction with the accompanying drawings wherein.

DETAILED DESCRIPTION

Figure 1:
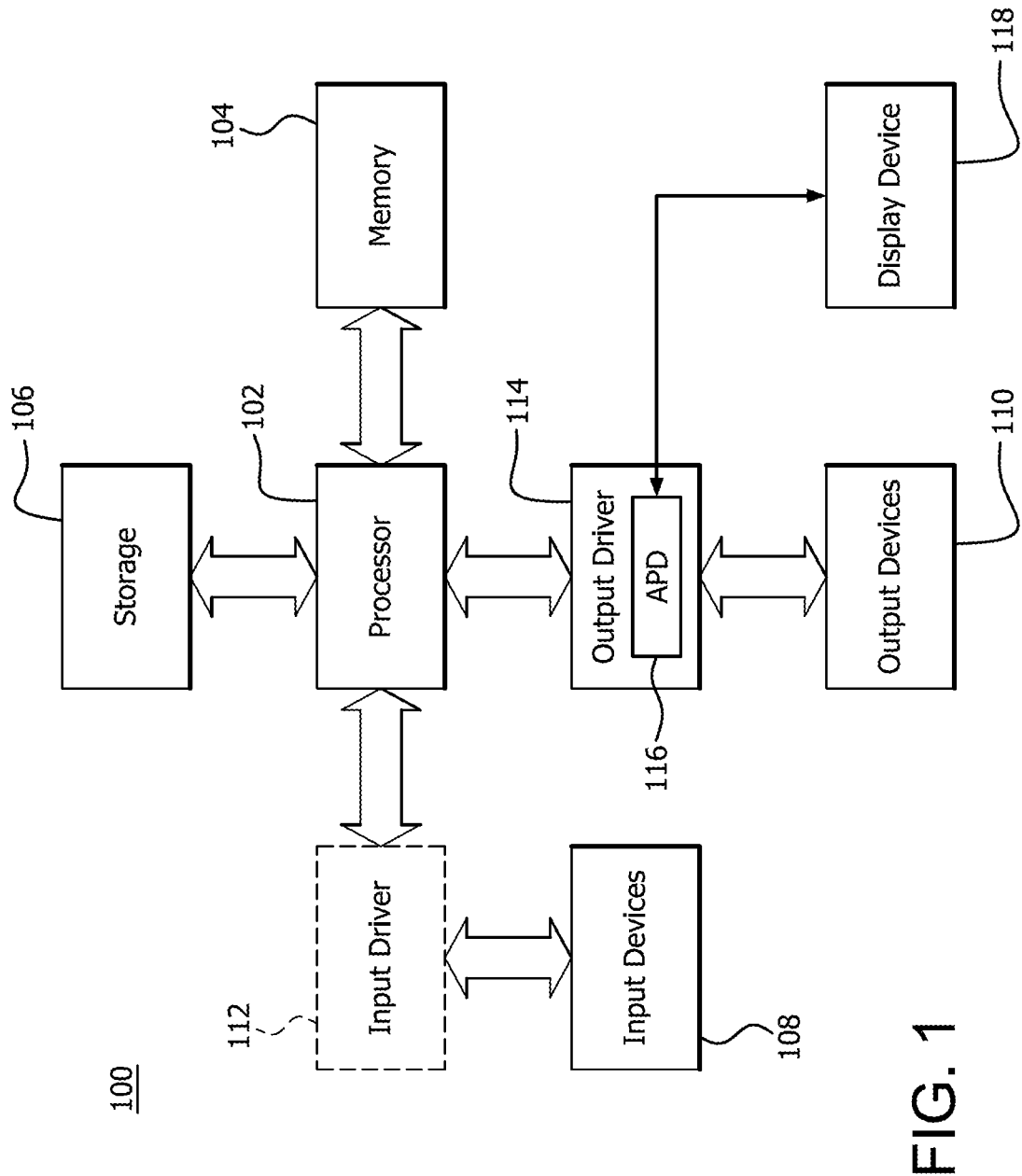
FIG. 1 is a block diagram of an example device in which one or more features of the disclosure can be implemented.

As used herein, a program includes any sequence of instructions (e.g., an application, a module, a kernel, a work item, a group of work items and the like) to be executed using one or more processors to perform procedures or routines (e.g., operations, computations, functions, processes and jobs). Processing of programmed instructions includes one or more of a plurality of processing stages, such as but not limited to fetching, decoding, scheduling for execution and executing the programmed instructions. Processing of programmed instructions includes the processing of data (e.g., video data) such as sampling data, encoding data, compressing data, reading and writing data, storing data, converting data to different formats (e.g., color spaces), performing calculations and controlling one or more components to process data.

Implementation of LTR via PCIe includes, for example, an end point (e.g., a GPU core) sending a message to a root point (e.g., CPU core), which includes a request to access (read or write) the memory and a latency tolerance (e.g., an LTR value) indicating an amount of time (e.g., clock cycles or real time, such as milliseconds) required to service the request by the GPU core. Processors (e.g., CPUs) typically support multiple power states, which include a working state and different power saving states during which less power is consumed than during the working state. The request to access the memory by the GPU can be serviced when the CPU is in the working state, but not when the CPU is in one of the power saving states.

The amount of time incurred to change from one of the power saving states to the working state varies depending on the deepness level of the power saving state. For example, a first power saving state can include cutting off power to clock gates, while a second power saving state, which is deeper than the first power saving state, can include cutting off power to the CPU core. More power is consumed during the first power saving state than the second power saving state. The second power saving state is a deeper power saving state than the first power saving state and a longer amount of time is incurred to change from the deeper second power saving state to the working state than to change from the first power saving state back to the working state.

Accordingly, to service a request from a GPU core corresponding to a relatively short latency tolerance, the CPU core enters a first power saving state, which consumes more power than deeper power saving states but allows for the first power saving state to timely change to the working state and service the memory access request within the latency tolerance limit indicated by the GPU core. To service a request from a GPU core corresponding to a relatively long latency tolerance (i.e., relatively large amount of time), however, the CPU core enters a second power saving state, which saves more power than the less deep first power saving state while allowing for the second power saving state to timely change to the working state and service the memory access request within the larger latency tolerance limit indicated by the GPU core.

In conventional systems, LTR programming is static and is based on the greatest latency (i.e., greatest delay) of portions (e.g., workloads) of a program (e.g., an application). That is, the CPU core enters a single state, to execute a particular program via many memory access requests, which is determined prior to runtime based on the greatest latency of the workloads of a program. Programs typically include varying latency tolerances, however, to execute different portions (e.g., workloads) of the program. For example, while some memory access requests for executing a portion of a program cannot be timely serviced by a CPU entering a deeper power saving state, other memory access requests for executing other portions of the program can be timely serviced when the CPU enters the deeper power saving state. Because LTR programming is static and based on the greatest latency of the program, however, the CPU enters the less deep power saving state to service each memory access request of the program, including the other memory access requests which could otherwise be timely serviced if the CPU entered the deeper power saving state, resulting in an inefficiently use of power to execute the program.

The present application provides processing devices and methods for dynamically controlling LTR values to efficiently service memory access requests from different types of program portions while managing power consumption. The processing devices and methods described herein include dynamically changing power saving states depending on the dynamically controlled LTR values.

One example of dynamically controlling LTR values includes storing a plurality of predetermined LTR value settings for different program portion types. Program portion types are identified by a processor at the end point device and LTR values are set in a register of the PCIe configuration space of the end point device according to the stored predetermined LTR value settings for the identified program portion types.

Another example of dynamically controlling LTR values includes monitoring PCIe traffic across the PCIe link to determine a PCIe traffic level across the PCIe link. LTR values are set in a register of the PCIe configuration space of the end point device according to the determined PCIe traffic level.

An endpoint processing device is provided for dynamically controlling latency tolerance reporting (LTR) values. The endpoint processing device includes memory configured to store data and a processor. The processor is configured to execute a program and send, to a root point processing device via a peripheral component interconnect express (PCIe) link, a plurality of messages each comprising a memory access request and a LTR value indicating an amount of time to service the memory access request. The processor is also configured to, for each of the plurality of messages, determine, during execution of the program, a LTR value setting and set the LTR value as the determined LTR value setting.

A processing device is provided for dynamically controlling latency tolerance reporting (LTR) values. The processing device includes a root point device in communication with a root point processor and root point memory, a peripheral component interconnect express (PCIe) link and an endpoint processing device. The endpoint processing device includes endpoint memory and an endpoint processor configured to execute a program. The endpoint processor is also configured to send, to a root point processing device via the PCIe link, a plurality of messages each comprising a memory access request to access the root point memory and a LTR value indicating an amount of time to service the memory access request. The endpoint processor is further configured to, for each of the plurality of messages, determine, during execution of the program, a LTR value setting and set the LTR value as the determined LTR value setting.

A method is provided for dynamically controlling latency tolerance reporting (LTR) values. The method includes executing a program by a processor of an endpoint device. The method also includes sending, from the endpoint device to a root point processing device via a peripheral component interconnect express (PCIe) link, a plurality of messages each comprising a memory access request and a LTR value indicating an amount of time to service the memory access request. The method further includes, for each of the plurality of messages, determining, by the processor of the endpoint device during execution of the program, a LTR value setting and setting the LTR value as the determined LTR value setting.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, memory 104, storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes one or more processors, such as a central processing unit (CPU), a graphics processing unit (GPU), or another type of compute accelerator, a CPU and GPU located on the same die, or one or more processor cores, wherein each processor core can be a CPU or a GPU or another type of accelerator. Multiple processors are, for example, included on a single board or multiple boards. Processor on one or more boards. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, one or more image capture devices (e.g., cameras), a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, one or more serial digital interface (SDI) cards, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The input driver 112 and the output driver 114 include, for example, one or more video capture devices, such as a video capture card (e.g., an SDI card). As shown in FIG. 1, the input driver 112 and the output driver 114 are separate driver devices. Alternatively, the input driver 112 and the output driver 114 are integrated as a single device (e.g., an SDI card), which receives captured image data and provides processed image data (e.g., panoramic stitched image data) that is stored (e.g., in storage 106), displayed (e.g., via display device 118) or transmitted (e.g., via a wireless network).

It is noted that the input driver 112 and the output driver 114 are optional components, and that the device 100 will operate in the same manner if the input driver 112 and the output driver 114 are not present. In an example, as shown in FIG. 1, the output driver 114 includes an accelerated processing device ("APD") 116 which is coupled to the display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
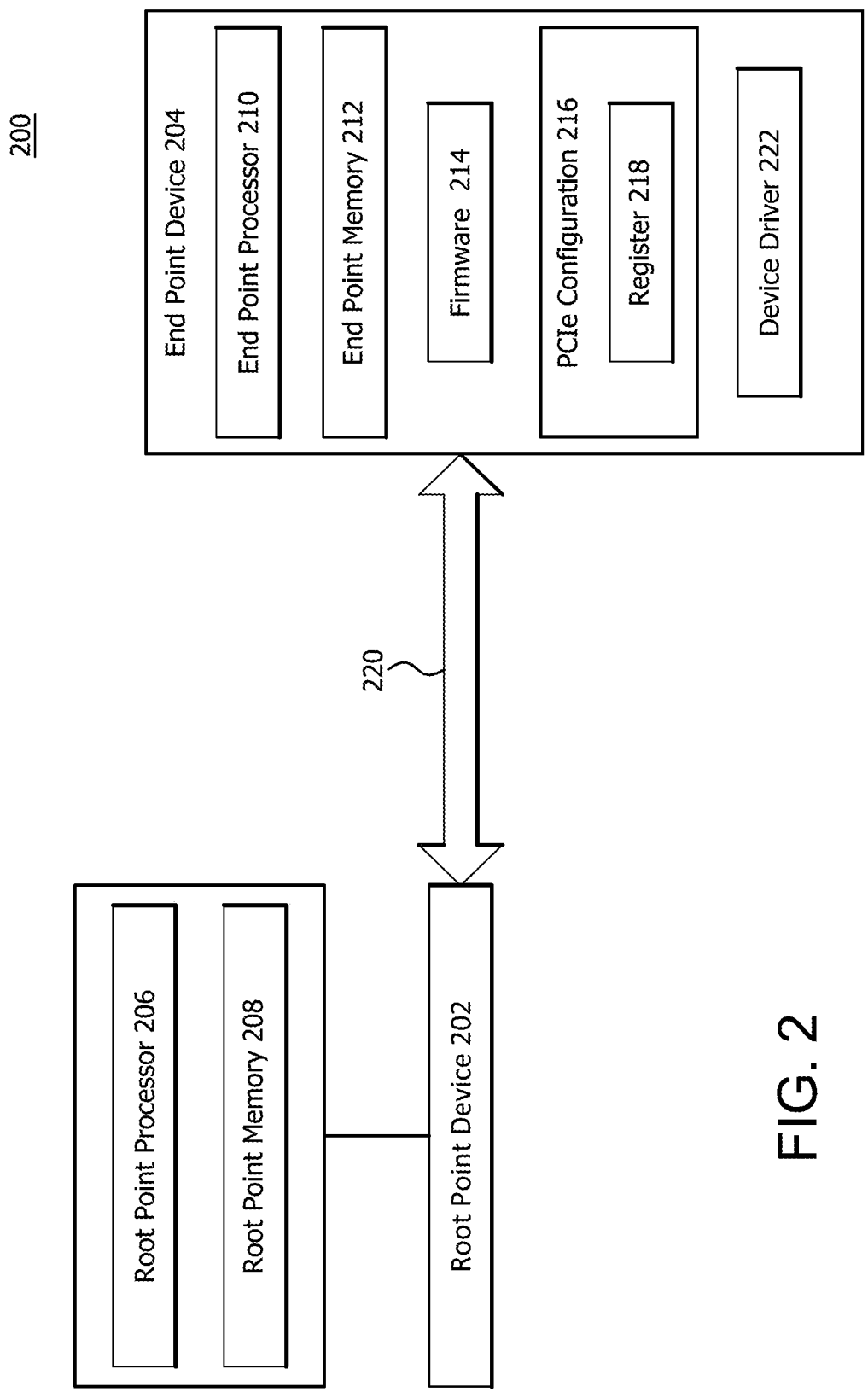
FIG. 2 is a block diagram illustrating exemplary components of a processing device in which one or more features of the disclosure can be implemented.

FIG. 2 is a block diagram illustrating exemplary components of a processing device 200 in which one or more features of the disclosure can be implemented. As shown in FIG. 2, processing device 200 includes a root point device 202, an end point device 204 and a PCIe link 220.

PCIe link 220 is a point-to-point (e.g., end point to root point) communication channel, which includes one or more lanes for allowing root point device 202 and end point device 204 to communicate PCIe traffic between each other. PCIe traffic includes any data sent across the PCIe link, such as messages, which include memory access requests (e.g., read and write access requests) and LTR reporting values as well as interrupts. PCIE traffic includes, for example, reading data from memory data and writing data to memory for purposes of direct memory accessing between local memory (e.g., local video memory) and main memory.

The root point device 202 is, for example, a root complex which includes a plurality of root points (e.g., root ports) each connecting the internal hardware, such as a root point processor 206 (e.g., CPU) and root point memory (e.g., main memory) 208, to a plurality of end point devices, such as end point device via PCIe link 220. For simplified explanation, FIG. 2 shows the root point device 202 connected to a single endpoint device 204 via PCIe link 220.

End point device 204 is, for example, a peripheral hardware device (e.g., graphics device, Ethernet device or USB device) which communicates with the root point processor 206 and the root point memory 208 via the PCIe link 220. The end point device 204 includes end point processor 210, end point memory 212, firmware 214 and PCIe configuration (e.g., PCIe configuration instructions) 216.

End point processor 210 is, for example, one or more GPU cores. End point processor 210 is configured to execute instructions to control operation of the end point device 204. For example, end point processor 210 is configured to send messages over PCIe link 220 to a CPU core 206 of the root point device 202 which includes, for example, a request (read request, write request) to access the root point memory (e.g., RAM) 208 as well as a latency tolerance (e.g., a LTR) value indicating an amount of time (e.g., clock cycles or real time, such as milliseconds) to service the memory access request. As described in more detail below, in one example, end point processor 210 is also configured to identify a type of portion of a program and set an LTR value in the register 218 according to a predetermined stored LTR value for the identified program portion type. As described in more detail below, in another example, end point processor 210 is also configured to determine a PCIe traffic level across the PCIe link and set an LTR value in the register 218 according to the determined PCIe traffic level.

Firmware 214 is used to store instructions, as well as a plurality of LTR settings (e.g., LTR values) for a plurality of program portion types (e.g., workload types to control operation of the endpoint device 204 and provide an interface between the hardware (e.g., processor 210 and memory 212) of the end point device 204 and device driver 222. In some example, LTR values reside in the device driver 222. Firmware 214 is stored in non-volatile memory (e.g., a hard-disk, motherboard boot read only memory (ROM), BIOS memory and the like).

Register 218 of PCIe configuration space 216 is an N-bit register in which the values of the bits provide the LTR setting indicating the amount of time to service a memory access request by the endpoint processor 210.

One example of dynamically controlling LTR values includes identifying a program portion type and setting the LTR values according to stored predetermined LTR value settings for different program portion types.

Figure 3:
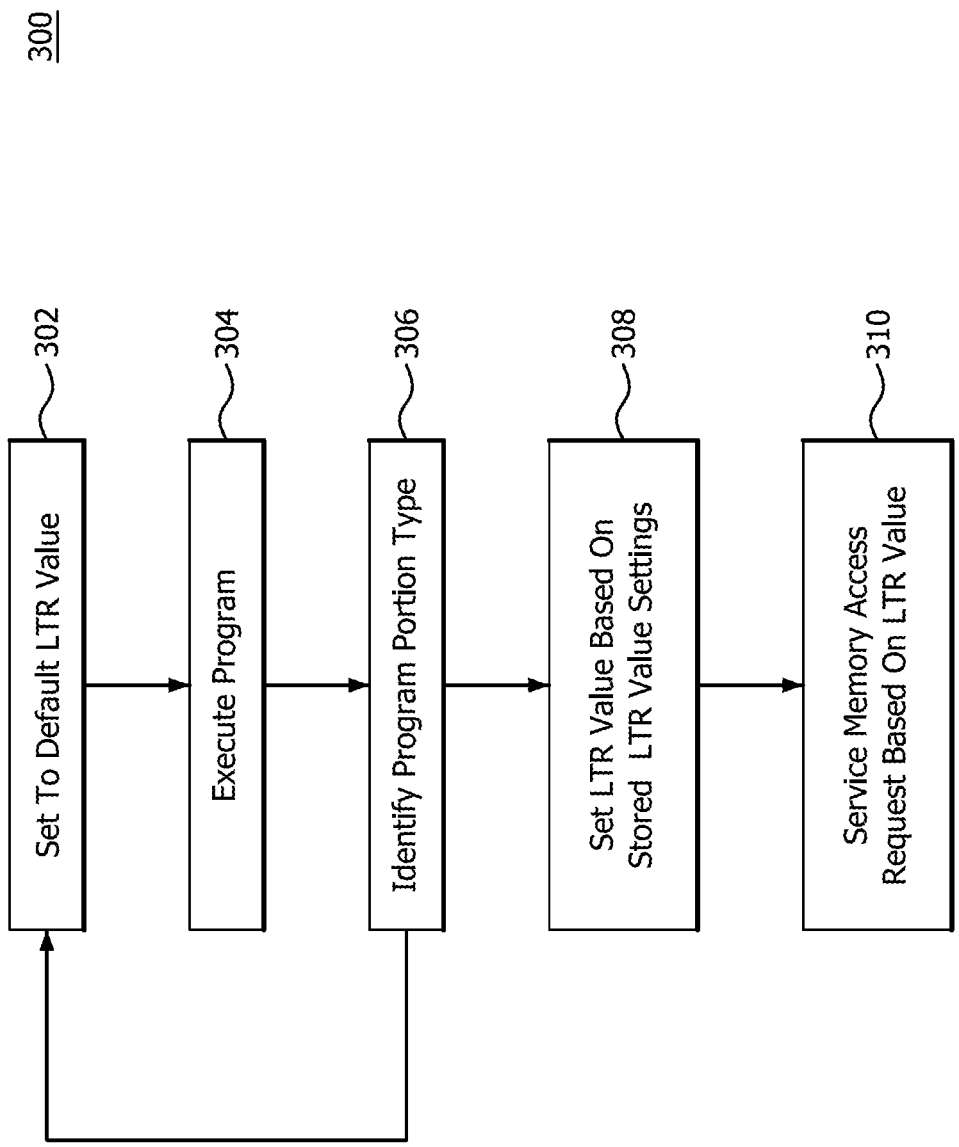
FIG. 3 is a flow diagram illustrating an example method of dynamically controlling LTR values according to stored predetermined LTR value settings for different program portion types.

FIG. 3 is a flow diagram illustrating an example method 300 of dynamically controlling LTR values according to stored predetermined LTR value settings for different program portion types.

As shown at block 302 of FIG. 3, the method 300 includes setting a default LTR value (e.g., after booting to desktop and prior to runtime, when the CPU is idle, or when there is no bus traffic (e.g., static screen)). For example, the LTR setting is initially set to a relatively large LTR value (e.g., indicating a latency tolerance of 3 ms) to save more power than would be consumed for a relatively smaller LTR value setting (e.g., indicating a latency tolerance of less than 3 ms). For this relatively large LTR value, the CPU core enters a state (e.g., less deep power saving state) to service the memory access requests by the endpoint device in a time equal or less than the relatively large LTR value.

As shown at block 304 of FIG. 3, the method 300 includes executing a program. For example, an endpoint processor (e.g., GPU) executes programmed instructions (e.g., instructions in device driver 222). The program includes any sequence of instructions (e.g., a work item, a group of work items, a wavefront and any other program portion) to be executed. Execution of the program includes sending messages, via a PCIe link, to a root point device (e.g., a PCIe root complex) in communication with the internal hardware (e.g., CPU and memory) of a computer. A message includes, for example, a request to access the memory (e.g., read from memory or write to memory) and an LTR value indicating the amount of time to service the memory access request by the endpoint device.

As shown at block 306 of FIG. 3, the method 300 includes identifying a program portion type. Identification of a program portion type includes identifying a type for any number of workload granularity levels, such as for example, identifying a program type for a portion comprising one or more work items, a portion comprising one or more workgroups and a portion comprising one or more wavefronts. Examples of program types include portions to execute video playback, portions to execute 3D graphics, portions to execute virtual reality (VR) and computing portions.

A program portion type is, for example, identified by utilizing the workload detection logic of the device driver (e.g., graphics driver). The workload detection logic determines a start of a workload, a type of workload (e.g., video workload, 3D graphics workload, compute workload, VII workload) and an end of the workload.

As shown at block 308 of FIG. 3, the method 300 includes setting LTR values based on stored predetermined LTR value settings for the identified program portion types. For example, a plurality of different program portion types are profiled offline to determine LTR value settings (e.g., to be set in the register 218 of the end point device 204) for each program portion type to manage power consumption while maintaining endpoint performance. These predetermined (e.g., determined prior to runtime) LTR value settings for each program portion type are, for example, sent via a network (not shown) and stored at the endpoint device. The LTR value per workload is, for example, hardcoded in the graphics driver (e.g., in a table). The LTR value settings include, for example, LTR value settings for new program portion types and for updating program portion types.

When a process is created to use an engine, the LTR value is dynamically set (e.g., changed to one of a plurality of power saving states) to efficiently service the memory access requests (i.e., saving power consumption while timely servicing the requests). That is, the LTR value setting is dynamically determined as the LTR value for a stored program portion type corresponding to the identified program portion type. For example, when the program begins executing at block 304 and a program portion type to be executed is identified as a video playback portion, an endpoint processor (e.g., processor 210) creates a process (e.g., video decoding process) to use an engine (e.g., decoding engine) to execute the video playback portion. For each memory access request by the endpoint device to execute the video playback portion, the stored LTR value setting for the identified video playback portion is determined (e.g., by the endpoint processor) and the LTR value is set (e.g., in register 218) to be a smaller LTR value (i.e., value indicating a smaller amount of time to service the request than the amount of time indicated by the initial LTR value) to timely service each memory access request.

The smaller LTR value causes the root point processor (e.g., CPU) to enter a less deep power saving state (i.e., state in which more power is consumed than the state caused by the default LTR value) to timely service the memory access requests of the video playback portion. When the endpoint processor determines, via the workload detection logic, that the process ends (e.g., the video playback portion of the program has completed execution), the endpoint processor either restores the LTR value back to the default setting or sets the LTR value for a newly identified program portion type.

The stored predetermined LTR value settings also include, for example, the default LTR value (shown at block 302). When the identified program is not among the stored program portion types, the LTR value is set as the default LTR value. Alternatively, the stored predetermined LTR value settings do include the default LTR value, such that when the identified program is not among the stored program portion types, the LTR value is merely set as the default LTR value.

Another example of dynamically controlling LTR values includes determining a PCIe traffic level sent across a PCIe link from an endpoint device to the root point device. That is, LTR values are dynamically controlled by determining a level of unidirectional PCIe traffic (i.e., upstream PCIe traffic) from the endpoint device to the root point device. PCIe traffic traveling from the root point device to the endpoint device indicates an active state, and the LTR value is ignored.

Figure 4:
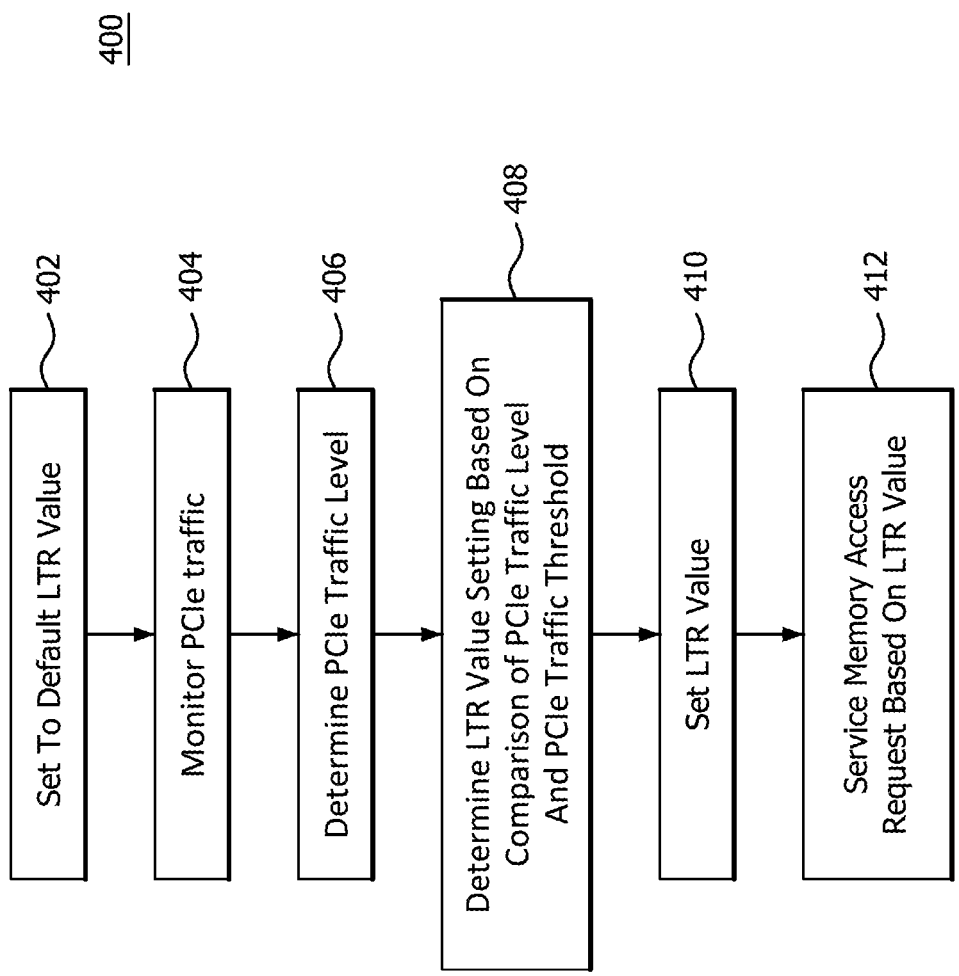
FIG. 4 is a flow diagram illustrating an example method of dynamically controlling LTR values according to a PCIe traffic level.

FIG. 4 is a flow diagram illustrating an example method 400 of dynamically controlling LTR values based on a PCIe traffic level across the PCIe link. As shown at block 402 of FIG. 4, the method 400 includes setting a default LTR value (e.g., after booting to desktop and prior to runtime) in the same manner as described above at block 302 of FIG. 3. For example, the LTR setting is initially set to a relatively large LTR value (e.g., indicating a latency tolerance of 3 ms) to save more power than would be consumed for a relatively smaller LTR value setting (e.g., indicating a latency tolerance of less than 3 ms).

As shown at block 404 of FIG. 4, the method 400 includes monitoring PCIe traffic (e.g., memory access requests) sent across the PCIe link from the end point device to the root point device. For example, an endpoint processor (e.g., GPU) of an end point device executes instructions stored in the firmware of the end point device to monitor the PCIe traffic (e.g., PCIe messages including memory access requests and LTR values) sent across a PCIe link from the end point device to the root point device.

The PCIe traffic (e.g., messages, requests, number of bits, etc.) is monitored via hardware or software, for example, as a function of the size of the traffic and how quickly the traffic moves (e.g., bandwidth). The PCIe traffic bandwidth is determined, for example, by incrementing or decrementing counters and determining the incrementing or decrementing frequency over a period of time. Programmed instructions may include conditions which change the LTR value based on size and speed of the traffic.

As shown in blocks 406 and 408 of FIG. 4, the method 400 includes determining a PCIe traffic level across the PCIe link and determining an LTR value setting based on a comparison of the PCIe traffic level and a PCIe traffic threshold. A PCIe traffic level is determined, for example, based on an amount of time in which PCIe traffic is continuously sent across the PCIe link, as described below with regard to FIG. 5. Alternatively or additionally, a PCIe traffic level is determined based on a PCIe traffic bandwidth, such as an amount of PCIe traffic (e.g., number of bits) sent across the PCIe link over a predetermined time interval (e.g., gigabytes per second). While buffer memory is allocated to implement both continuous detection and bandwidth detection, determining a PCIe traffic level using both continuous detection and bandwidth detection facilitates a more accurate determination of the PCIe traffic level because small bursts of traffic which are not detected by the continuous detection are detectable by the bandwidth detection. Some examples also include determining between implementing continuous detection or bandwidth detection (e.g., using an identified program portion type, the state of other PCIe links or other factors).

Figure 5:
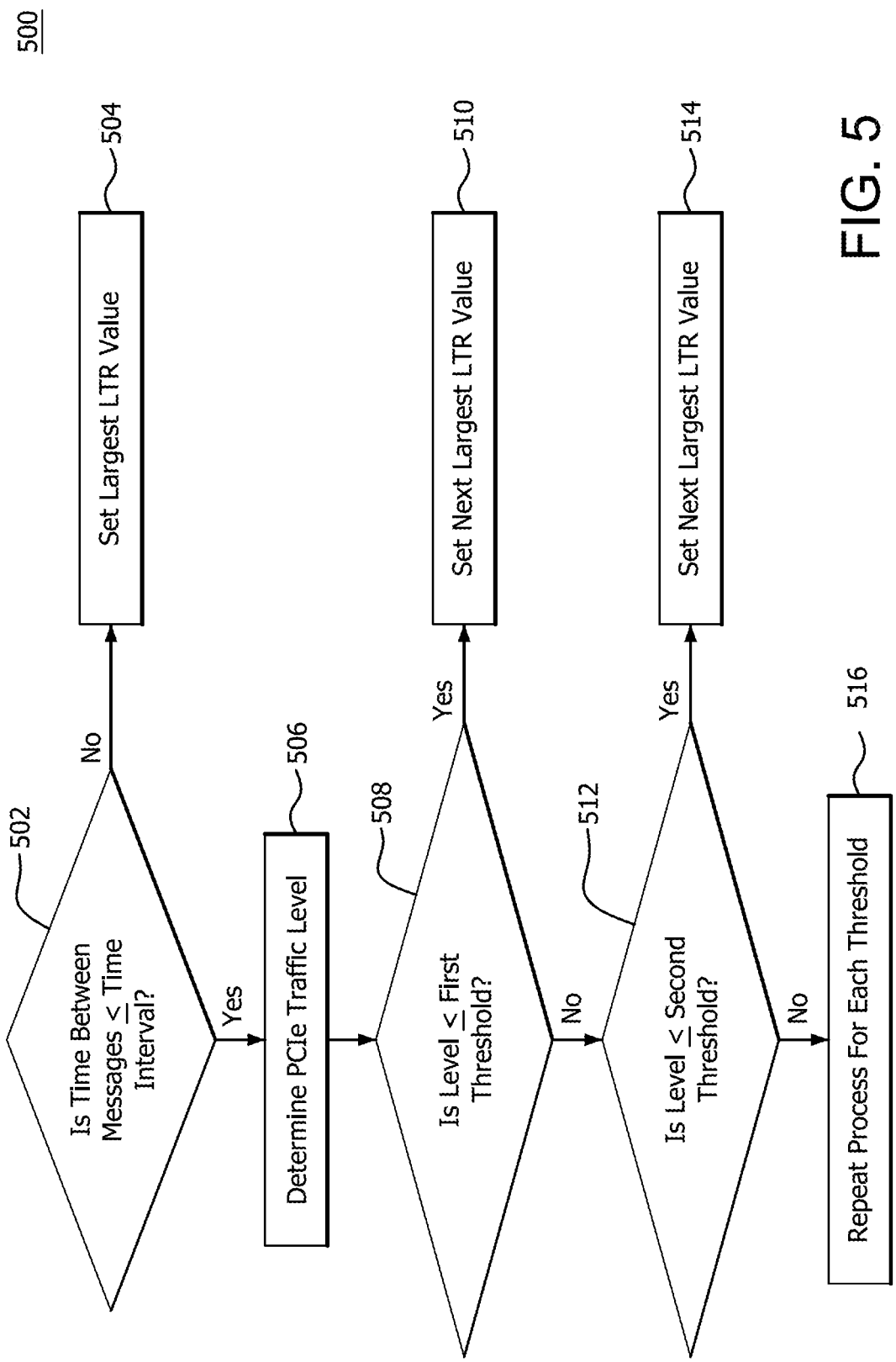
FIG. 5 is a flow chart illustrating an example method of determining a PCIe traffic level according to an amount of time in which PCIe traffic is sent continuously across the PCIe link.

FIG. 5 is a flow chart illustrating an example method 500 of determining an LTR value setting based on a comparison of PCIe traffic level and a PCIe traffic threshold. Method 500 is a more detailed example of the process shown at blocks 406 and 408 of FIG. 4 in which the PCIe traffic level is an amount of time in which PCIe traffic is sent continuously across the PCIe link.

PCIe traffic is determined to be sent continuously when the amount of time between PCIe messages sent across the PCIe link is equal to or less than a predetermined time interval (e.g., 1 second). As described above, PCIe traffic includes any data sent across the PCIe link, including messages and interrupts. The PCIe traffic is identified, for example, via a PCIe packet which includes data in a header and payload data. For example, as shown at decision block 502, when the amount of time between PCIe messages sent across the PCIe link is determined not to be equal to or less than (i.e., greater than) the predetermined time interval, then the PCIe traffic is determined as not being sent continuously (e.g., PCIe traffic level=0), the root point processor is considered to be idle and the LTR value is set (e.g., in register 218) to be the largest available LTR value setting, as shown at block 504, such that the root point processor enters a deep power saving state to conserve power.

When the amount of time between PCIe messages sent across the PCIe link is determined, at decision block 502, to be equal to or less than the predetermined time interval, then the PCIe traffic is determined as being sent continuously and the method proceeds to block 506 to determine the PCIe traffic level by the amount of time in which the PCIe traffic is continuously sent across the PCIe link. For example, the end point processor determines a starting time when PCIe data is sent over the PCIe link and an end time when PCIe data stops being sent over the PCIe link. The end time is determined, for example, when the predetermined time interval (e.g., 1 second) used at block 502 has expired in which no PCIe traffic is sent (i.e., when the PCIe traffic is determined as not being sent continuously).

After the PCIe traffic level is determined, the LTR value setting is determined based on a comparison of the determined PCIe traffic level to a PCIe traffic level threshold. Any number of PCIe traffic level thresholds can be used based on the number of available LTR value settings. For example, if the register is a 3-bit register, then there are 8 available LTR value settings, the largest of which is the setting used at block 504 if the PCIe traffic is determined as not being sent continuously.

The PCIe traffic level is, for example, compared to increasing PCIe traffic level thresholds until it is determined which one of the remaining LTR value settings should be used as the LTR value setting. For example, the PCIe traffic level (i.e., the determined amount of time in which the PCIe traffic is continuously sent across the PCIe link) is compared to a first PCIe traffic level threshold (i.e., a first threshold amount of time) which corresponds to a relatively small amount of time. When the amount of time (i.e., the determined PCIe traffic level) is determined, at decision block 508, to be equal to or less than the first threshold amount of time, a relatively small amount of PCIe traffic is indicated and, therefore, a relatively large latency tolerance to service requests is indicated. Accordingly, as shown at block 510, the LTR value is set to the largest one of the remaining LTR value settings which causes the root point processor to enter a deep power saving state.

When the amount of time (i.e., the determined PCIe traffic level) is determined, at decision block 508, to not be equal to or less than (i.e., greater than) the first threshold amount of time, the PCIe traffic level is compared to a second PCIe traffic level threshold (i.e., a second threshold amount of time), which corresponds to a larger amount of time than the first threshold amount of time but less than the next threshold amount of time (i.e., the third threshold amount of time). For example, as shown in FIG. 5, when the amount of time (i.e., the determined PCIe traffic level) is determined, at decision block 512, to be equal to or less than the second threshold amount of time, an amount of PCIe traffic is indicated which is larger than the amount of PCIe traffic indicated by the first threshold amount of time). Accordingly, as shown at block 514, the LTR value is set to the next largest one of the LTR value settings, which causes the root point processor to enter a less deep power saving state than the power saving state entered if the PCIe traffic level was determined to be equal to or less than the first PCIe traffic level threshold.

When the amount of time (i.e., the determined PCIe traffic level) is determined, at decision block 512, to not be equal to or less than (i.e., greater than) the second threshold amount of time, the process illustrated at blocks 508 to 514 repeats for each of the remaining PCIe traffic level thresholds in increasing order until an LTR value setting is determined, as shown at block 516. For example, when the amount of time (i.e., the determined PCIe traffic level) is determined, at decision block 512, to not be equal to or less than (i.e., greater than) the second threshold amount of time, the PCIe traffic level is compared to a third PCIe traffic level threshold, and so on, until the PCIe traffic level is compared to the last PCIe traffic level threshold (i.e., the threshold having the largest threshold amount of time for each of the thresholds). When the amount of time (i.e., the determined PCIe traffic level) is determined to not be equal to or less than (i.e., greater than) the last threshold amount of time, the LTR value is set to the smallest one of the LTR value settings, which causes the root point processor to enter a power saving state which consumes a relatively large amount of power, but can timely service the requests with a relatively low latency tolerance time.

In the example described above, the PCIe traffic level is compared to increasing PCIe traffic level thresholds until an LTR value setting is determined. That is, the PCIE traffic is continuously monitored such that a comparison is made with increasing time thresholds at equal predetermined intervals. In this manner, when it is determined that a PCIe traffic level is greater than a threshold, the next comparison to the next threshold is made after the next predetermined interval has expired and an LTR value is set when it is determined that a PCIe traffic level is less than or equal to a threshold.

As described above, alternatively or additionally, determining a PCIe traffic level includes determining the PCIe traffic bandwidth sent across the PCIe link from the end point device to the root point device. For example, the end point processor determines an amount of PCIe data sent across the PCIe link over a period of time (e.g., gigabytes per second). In this example, an LTR value setting is determined based on a comparison of the PCIe traffic bandwidth and a PCIe traffic bandwidth threshold. The process for this example is performed in a similar manner to the process shown in FIG. 5 and, therefore, is not shown again for determining the PCIe traffic bandwidth as being superfluous.

Referring back to FIG. 4, after an LTR value setting is determined at block 408, the LTR value is set in the register of the PCIe configuration space. Memory access requests are then serviced according to the LTR value set in the register, as shown at block 412.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. An endpoint processing device for dynamically controlling latency tolerance reporting (LTR) values, the endpoint processing device comprising:
    memory configured to store data; and
    a processor configured to:
        execute a program;
        send, to a root point processing device via a peripheral component interconnect express (PCIe) link, a plurality of messages each comprising a memory access request and a LTR value indicating an amount of time to service the memory access request; and
        for each of the plurality of messages;
            monitor PCIe traffic sent across the PCIe link from the endpoint processing device to the root point processing device;
            determine, during execution of the program, a LTR value setting based on a comparison of a PCIe traffic level of the PCIe traffic sent across the PCIe link to a PCIe traffic level threshold; and
            set the LTR value as the determined LTR value setting.

2. The endpoint processing device according to claim 1, wherein the processor is further configured to:
    store a plurality of LTR value settings each corresponding to one of a plurality of program portion types;
    identify a program portion type of the executing program; and
    determine the LTR value setting corresponding to the identified program portion type.

3. The endpoint processing device according to claim 2, wherein the program portion type is identified based on a workload detection logic of a device driver of the endpoint processing device.

4. The endpoint processing device according to claim 1, wherein the processor is further configured to:
    determine the PCIe traffic level based on an amount of time in which PCIe traffic is sent continuously across the PCIe link.

5. The endpoint processing device according to claim 4, wherein the processor is further configured to:
    determine that the PCIe traffic is sent continuously across the PCIe link when the amount of time between PCIe messages sent across the PCIe link is equal to or less than a predetermined time interval; and
    determine the PCIe traffic level by the amount of time in which the PCIe traffic is continuously sent across the PCIe link.

6. The endpoint processing device according to claim 5, wherein the processor is further configured to determine the LTR value setting by comparing the PCIe traffic level to each of a plurality of increasing PCIe traffic level thresholds until it is determined that the PCIe traffic level is less than or equal to one of the PCIe traffic level thresholds or until the PCIe traffic level is compared to each of the PCIe traffic level thresholds.

7. The endpoint processing device according to claim 1, wherein the processor is further configured to determine the PCIe traffic level based on an amount of PCIe traffic sent across the PCIe link over a predetermined time interval.

8. The endpoint processing device according to claim 1, wherein the processor is further configured to set the LTR value in a register of a PCIe configuration space of the endpoint processing device.

9. A processing device for dynamically controlling latency tolerance reporting (LTR) values, the processing device comprising:
    a root point device in communication with a root point processor and root point memory;
    a peripheral component interconnect express (PCIe) link; and
    an endpoint processing device comprising:
        endpoint memory; and
        an endpoint processor configured to:
            execute a program:
            send, to a root point processing device via the PCIe link, a plurality of messages each comprising a memory access request to access the root point memory and a LTR value indicating an amount of time to service the memory access request; and
            for each of the plurality of messages,
                monitor PCIe traffic sent across the PCIe link from the endpoint processing device to the root point processing device;
                determine, during execution of the program, a LTR value setting based on a comparison of a determined PCIe traffic level of the PCIe traffic sent across the PCIe link to a PCIe traffic level threshold; and
                set the LTR value as the determined LTR value setting.

10. The processing device according to claim 9, wherein the endpoint processor is further configured to:
    store a plurality of LTR value settings each corresponding to one of a plurality of program portion types;
    identify a program portion type of the executing program; and
    determine the LTR value setting corresponding to the identified program portion type.

11. The processing device according to claim 10, wherein the endpoint processor is further configured to identify the program portion type using workload detection logic of a device driver of the endpoint processing device.

12. The processing device according to claim 9, wherein the endpoint processor is further configured to determine the PCIe traffic level based on an amount of time in which PCIe traffic is sent continuously across the PCIe link.

13. The processing device according to claim 12, wherein the endpoint processor is further configured to:
    determine that the PCIe traffic is sent continuously across the PCIe link when the amount of time between PCIe messages sent across the PCIe link is equal to or less than a predetermined time interval; and
    determine the PCIe traffic level by the amount of time in which the PCIe traffic is continuously sent across the PCIe link.

14. The processing device according to claim 9, wherein the endpoint processor is further configured to determine the PCIe traffic level based on an amount of PCIe traffic sent across the PCIe link over a predetermined time interval.

15. A method for dynamically controlling latency tolerance reporting (LTR) values, the method comprising:
    executing a program by a processor of an endpoint device;
    sending, from the endpoint device to a root point processing device via a peripheral component interconnect express (PCIe) link, a plurality of messages each comprising a memory access request and a LTR value indicating an amount of time to service the memory access request; and
    for each of the plurality of messages;
        monitoring PCIe traffic sent across the PCIe link from the endpoint processing device to the root point processing device;

determining, by the processor of the endpoint device during execution of the program, a LTR value setting based on a comparison of a determined PCIe traffic level of the PCIe traffic sent across the PCIe link to a PCIe traffic level threshold; and setting the LTR value as the determined LTR value setting.

16. The method according to claim 15, further comprising:

storing a plurality of LTR value settings each corresponding to one of a plurality of program portion types;

identifying a program portion type of the program; and determining the LTR value setting corresponding to the identified program portion type.

17. The method according to claim 15, further comprising:

determining the PCIe traffic level, sent across the PCIe link from the endpoint processing device to the root point processing device, based on an amount of time in which the PCIe traffic is sent continuously across the PCIe link.

18. The method according to claim 15, further comprising:

determining the PCIe traffic level, sent across the PCIe link from the endpoint processing device to the root point processing device, based on an amount of PCIe traffic sent across the PCIe link over a predetermined time interval.

19. The method according to claim 17, further comprising:

determining that the PCIe traffic is sent continuously across the PCIe link when the amount of time between PCIe messages sent across the PCIe link is equal to or less than a predetermined time interval.

20. The method according to claim 19, further comprising:

determining the PCIe traffic level by the amount of time in which the PCIe traffic is continuously sent across the PCIe link.

* * * * *